United States Patent
Yamagishi et al.

(10) Patent No.: US 8,491,043 B2
(45) Date of Patent: Jul. 23, 2013

(54) VEHICLE BODY STRUCTURE

(75) Inventors: Hideaki Yamagishi, Wako (JP); Yosuke Akizuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/501,528

(22) PCT Filed: Sep. 9, 2010

(86) PCT No.: PCT/JP2010/065520
§ 371 (c)(1),
(2), (4) Date: Apr. 12, 2012

(87) PCT Pub. No.: WO2011/045995
PCT Pub. Date: Apr. 21, 2011

(65) Prior Publication Data
US 2012/0200118 A1      Aug. 9, 2012

(30) Foreign Application Priority Data

Oct. 14, 2009  (JP) .................................. 2009-237466
Oct. 14, 2009  (JP) .................................. 2009-237501

(51) Int. Cl.
*B62D 25/08* (2006.01)
(52) U.S. Cl.
USPC ........................................ 296/192; 296/198

(58) Field of Classification Search
USPC ................ 296/198, 192, 203.02, 193.09
See application file for complete search history.

(56) References Cited

FOREIGN PATENT DOCUMENTS

| JP | S56-106976 | 8/1981 |
|---|---|---|
| JP | S59-97103 | 7/1984 |
| JP | S63-57182 | 4/1988 |
| JP | 03-213475 | 9/1991 |
| JP | H05-68707 | 9/1993 |
| JP | 2001-180522 | 7/2001 |
| JP | 2003-267263 | 9/2003 |
| JP | 2007-152992 | 6/2007 |
| JP | 2007-223441 | 9/2007 |

*Primary Examiner* — Dennis Pedder
*Assistant Examiner* — Beverly Becker
(74) *Attorney, Agent, or Firm* — Rankin, Hill & Clark LLP

(57) ABSTRACT

Disclosed is a vehicle body structure provided with an attachment structure of a front fender and a side cowl top. The front fender (15) is provided with a first attachment bearing surface (123) that is formed at the end of a terminal flange (122) formed on the side of the side cowl top, and that is formed along the direction that the terminal flange (122) extends; and a second attachment bearing surface (124) formed so as to be perpendicular to the direction that the terminal flange (122) extends. The side cowl top (28) is provided with a plurality of hooking sections (143-145) that engage the terminal flange (122); a first interlocking section (147) that engages the first attachment bearing surface (123); and a second interlocking section (148) that engages the second attachment bearing surface (124).

11 Claims, 12 Drawing Sheets

VEHICLE BODY STRUCTURE

TECHNICAL FIELD

The present invention relates to a vehicle body structure and, in particular, to an improved cowl top.

BACKGROUND ART

A cowl top supported by a front fender has been known in the art. The cowl top includes a center cowl top and left and right side cowl tops which are integrally formed with the center cowl top. Some type of vehicle includes a center cowl top and left and right side cowl tops separated from the center cowl top.

An attachment structure of such a cowl top has been known such that both ends of the cowl top are fitted to a front fender (for example, see Patent Literature 1 below).

A cowl top disclosed in Patent Literature 1 is disposed in a space defined by a front fender, a hood and a windshield. The cowl top is attached to a vehicle body with protruded portions of the front fender engaged with cutouts at opposite lateral ends of the cowl top.

For a vehicle having a cowl top divided into a center cowl top and left and right side cowl tops with boundaries between the center cowl top and side cowl tops continuous respectively to boundaries between a hood and front fenders, or a vehicle having a widely rounded (curved) windshield, the side cowl top is accommodated in a narrow and long space defined by the center cowl top, the front fender and the windshield.

If the side cowl top is modified to extend to the center cowl top side for attachment to the center cowl top, the boundary between the center cowl top and the side cowl top is not continuous to the boundary between the hood and the front fender. That is, an attachment structure of a cowl top of Patent Literature 1 is not useful in the above-mentioned vehicle with the side cowl top modified.

Further, there has been known a vehicular cowl top having a recess accommodating a wiper rotational shaft of a wiper device. This type of cowl top is designed to allow for removal of powder snow as the snow is accumulated in the recess. Further, it is appropriately designed to cover the wiper rotational shaft to the extent possible. As such a cowl top, there has been known a cowl top having a net for preventing powder snow ingress (for example, Patent Literature 2 below).

The cowl top disclosed in Patent Literature 2 extends laterally of a vehicle between a hood and a windshield. The cowl top has an air intake port for taking in external air and a net disposed to prevent entry of power snow into the air intake port.

With the cowl top of Patent Literature 2, it is preferable for the cowl top to completely conceal a wiper rotational shaft for improved vehicular design. The complete concealment of the wiper rotational requires a larger depth of the recess. The least snow can be removed from the recess of larger depth. Accordingly, the recess to accommodate the wiper rotational shaft should be formed to allow for complete removal of snow from the recess.

PRIOR ART LITERATURE

Patent Literature

Patent Literature 1: JP-A-2001-180522
Patent Literature 2: JP-U-5-68707

SUMMARY OF INVENTION

Problems to be Solved by the Invention

To address the above problems, the present invention provides a vehicle body structure capable of achieving actualization of a vehicle which is designed so that boundary lines between a center cowl top and side cowl tops are continuous to boundary lines between a hood and front fenders while a windshield is widely rounded (curved). Further, the present invention provides a vehicle body structure capable of completely removing snow from a recess at which a wiper rotational shaft is arranged while completely concealing the wiper rotational shaft with a cowl top.

Means to Solve the Problems

According to one aspect of the present invention, there is provided a vehicle body structure comprising: right and left front fenders; a windshield; a cowl top; and side cowl tops each disposed within a space defined by the windshield, the cowl top, and each of the right and left front fenders, wherein the front fender includes an edge extending alongside the side cowl top, a first attachment flange disposed along the edge, a second attachment flange disposed perpendicularly to a direction of extension of the edge, and an elongated hole formed on the second attachment flange; and wherein each of the side cowl tops includes a hook portion engaged with the edge, a first fitting portion engaged with the first attachment flange, and a second fitting portion engaged with the second attachment flange.

Preferably, the first attachment flange is located rearward of the second attachment flange.

Preferably, each of the side cowl tops includes a fender-side lateral wall portion contiguous to the front fender and a glass-side vertical wall portion disposed on a side of the windshield side, and wherein the fender-side lateral wall portion and the glass-side vertical wall portion jointly define a generally L-shaped cross-section.

Preferably, the vehicle body structure further comprises a hood covering an engine compartment and pivotably attached to a vehicle body via a hood hinge in such a manner as to move between an opened position and a closed position, wherein the cowl top is disposed rearward of the hood and covers a wiper rotational shaft of a wiper arm, and wherein the cowl top includes an accommodating portion accommodating the wiper rotational shaft and an opening defined in the accommodating portion for removal of snow from a side of the engine compartment.

Preferably, the accommodating portion includes a recess formed in the cowl top and a cover member covering the recess.

Preferably, the recess includes a side wall concealing the hood hinge.

Preferably, the recess includes an erected wall disposed at a lower end of the opening to block rain water.

Preferably, the recess includes a drainage aperture for draining rainwater off the engine compartment.

Preferably, the cowl top includes a plurality of air-introducing holes formed therethrough for introducing air into the engine compartment, wherein the plurality of air-introducing holes include ones located below a portion of the cover member, and wherein the portion of the cover member defines a plurality of ornamental blind holes.

Preferably, the cowl top includes a first attachment rib fitted to a hood sealing disposed on a side of the hood, and wherein the cover member includes a second attachment rib fitted to the hood sealing disposed at the side of the hood, and wherein the first attachment rib and the second attachment rib overlap at overlap portions thereof, the overlap portion of the first attachment rib has a half thickness of an overall thickness of the first attachment rib, and the overlap portion of the second attachment rib has a half thickness of an overall thickness of the second attachment rib.

Preferably, the cowl top includes a fragile portion, and the cover member overlaps the fragile portion.

Advantageous Effects

The front fender includes the edge, the first attachment flange, a circular hole formed at the first attachment flange, the second attachment flange, and the elongated hole formed at the second attachment flange. Further, the side cowl top includes the hook portion to be engaged with the edge, the first fitting portion to be engaged with the first attachment flange, and the second fitting portion to be engaged with the second attachment flange. Accordingly, the side cowl top can be easily attached by being rotated while the hook portion is hooked to the edge. That is, the side cowl top can be easily attached even to a narrow and long-concaved space which is surrounded by the cowl top, the front fender, and the windshield.

The first attachment flange is located at the rear side of the vehicle against the second attachment flange. For example, even when the side cowl top is shaped to be approximately triangular having an apex at a rear part, it is possible to form the second attachment flange which is formed at the end edge of the edge as being perpendicular to the direction to which the edge extends.

The side cowl top includes the fender-side lateral wall portion extended continuously toward the front fender and the glass-side vertical wall portion formed at the windshield side. Since the fender-side lateral wall portion and the glass-side vertical wall portion are formed to have an approximately L-shaped section, the hinge cover can be easily attached to the front fender by being rotated as the hook portion being hooked to the edge, even in a case that the fender-side lateral wall portion is required to be deeply formed, for example. As a result, it is possible to increase design flexibility of the hinge cover.

The cowl top includes the accommodating portion formed to accommodate the wiper rotational shaft and the opening arranged at the accommodating portion enabling to scoop out snow from the engine compartment side. Accordingly, the accommodating portion can be formed deeply to the extent to completely conceal the wiper rotational shaft. As a result, vehicle appearance can be improved.

Further, for scooping out snow accumulated at the accommodating portion, the accumulated snow can be scooped out from the engine compartment side after opening the hood.

Since the accommodating portion is structured with the recess formed at the cowl top and the cover member put over the recess, attaching and detaching of the wiper device including the wiper arm can be easily performed. As a result, it is possible to improve vehicle assembling easiness.

Since the recess includes the side wall which conceals the hood hinge, it is possible to make the hood hinge invisible from the outside of the vehicle body. As a result, vehicle appearance can be further improved.

Since the recess is provided with the erected wall which blocks rain water at the lower end of the opening, it is possible to prevent ingress of rain water to the engine compartment side.

Since the drainage aperture which drains rain water to the outside of the engine compartment is formed at the recess, rain water can be smoothly drained to the outside of the engine compartment. As a result, it is possible to prevent ingress of rain water into the engine compartment.

The cowl top includes the plurality of pierced air-introducing holes which introduces air into the engine compartment, a part of the air-introducing holes is located below the cover member, and the plurality of ornamental blind holes is arranged at an area of the cover member corresponding to a part of the air-introducing holes. Accordingly, air entering to the air-introducing holes through the clearance between the cowl top and the cover member can be introduced into the engine compartment and the wiper rotational shaft can be concealed.

The cowl top includes the first attachment rib to which the hood sealing is fitted at the hood side, the cover member includes the second attachment rib to which the hood sealing is fitted at the hood side, and each thickness of the first and second attachment ribs at the overlapping portion thereof is halved. Accordingly, the hood sealing can be fitted to the cover member continuously to the cowl top. As a result, the hood sealing can be attached continuously to the first and second attachment ribs, so that vehicle assembling easiness can be improved. Further, it is also possible to prevent the cover member from being deliberately detached.

Since the cowl top is provided with the fragile portion formed at the area overlapping with the cover member, it is possible to let the fragile portion to be broken when a predetermined load is exerted to the cowl top. As a result, it is possible to contribute safety for pedestrians.

MODE OF CARRYING OUT THE INVENTION

Figure 1:
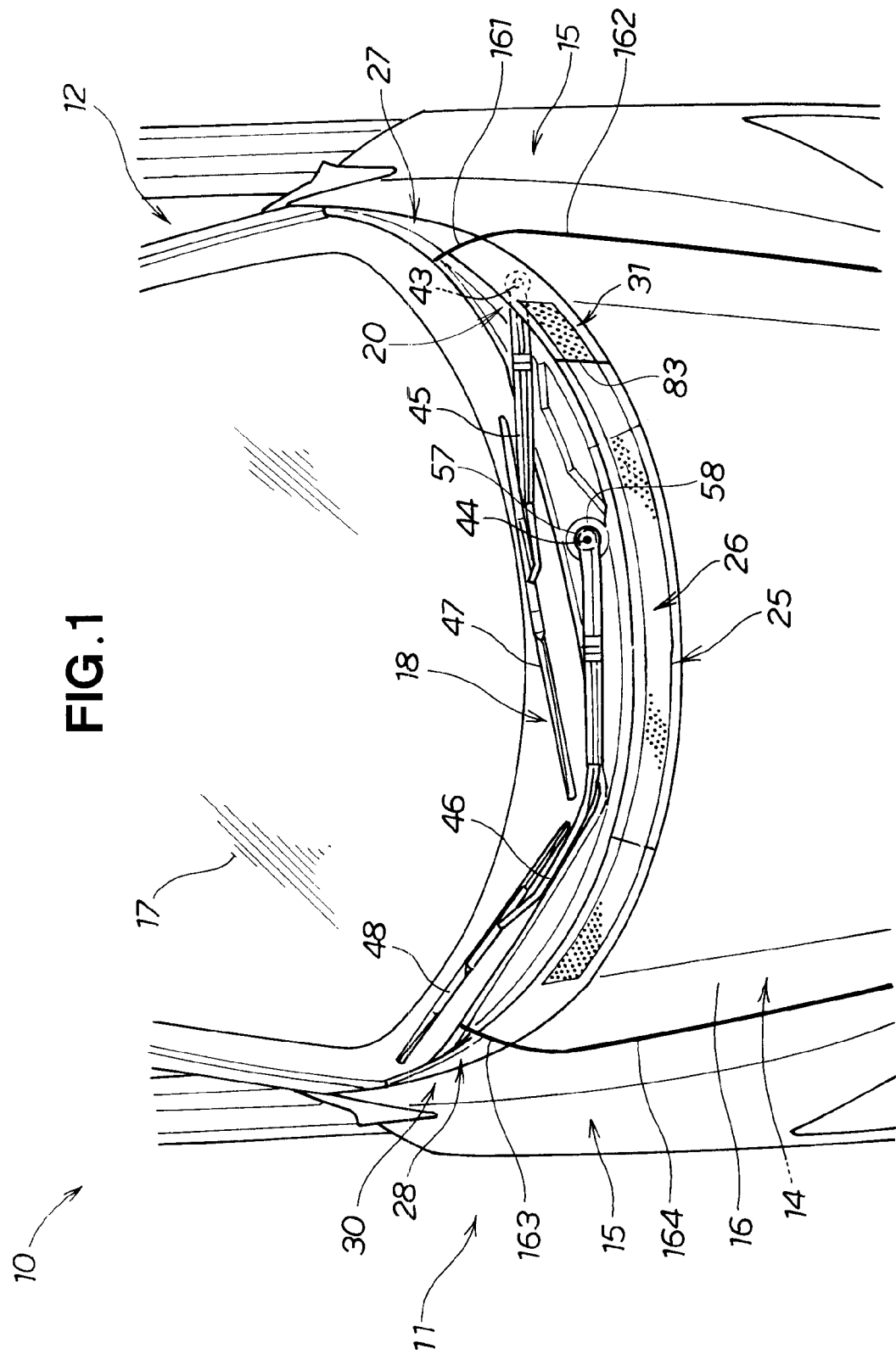
FIG. 1 is a top plan view of a vehicle employing structures of a side cowl top and a cowl top according to the present invention.

In the following, preferable embodiments of the present invention will be described with reference to the attached drawings.

Embodiments

As illustrated in FIGS. 1, 2, 3, 7 and 8, a vehicle 10 includes a vehicle body 11 defining an engine compartment 14 which accommodates an engine (not illustrated), auxiliaries and the like, and a passenger compartment 12. Within the passenger compartment 12 are disposed seats (not illustrated) for occupants and the like. The vehicle 10 also includes front fenders 15, 15 which cover sides of the engine compartment 14, a hood 16 which covers the upper side of the engine compartment 14, a windshield (a wind shield) 17 which separates the passenger compartment 12 from the outside, and a wiper device 18 for wiping rainwater off the windshield 17.

Further, the vehicle 10 is designed so that boundaries 161, 163 between a center cowl top 26 and left and right side cowl tops (hinge covers) 27, 28 are contiguous with boundaries 162, 164 between the hood 16 and the front fenders 15, 15. It will be appreciated that a windshield 17 is widely curved forward.

The hood 16 is pivotably attached to the vehicle body 11 via a hood hinge 42 interposed therebetween, such that the hood 16 moves between an open position and a closed position.

The wiper device 18 includes left and right wiper rotational shafts (pivot shafts) 43, 44 designed to be driven by a wiper motor (not illustrated) via a linkage mechanism (not illustrated). Attached to the wiper rotational shafts 43, 44 are left and right wiper arms 45, 46 designed to swing alongside the windshield 17. The wiper device 18 includes left and right wiper blades 47, 48 attached to the respective top ends of the left and right wiper arms 45, 46 for wiping raindrops off the windshield 17.

A cowl top 25 includes the center cowl top 26 disposed centrally of the vehicle body 11. Disposed at the right and left of the center cowl top 26 are the left and right side cowl tops (the hinge covers) 27, 28. The cowl top 25 includes a cover member 31 disposed between the left end of the center cowl top 26 and the left side cowl top 27, and a hood sealing 33 (see FIG. 8) which seals a gap between the rear end of the hood 16 and the front end of the cowl top 25.

The right side cowl top 28 is attached to the front fender 15 and covers the right hood hinge 42. The left side cowl top 27 is attached to the front fender 15 and covers the left hood hinge (not illustrated).

The cowl top 25 includes a cowl top structure 20 at the left side area thereof. The cowl top structure 20 is defined by the cover member 31 and a side end portion 53 of the center cowl top 26.

The vehicle 10 includes an attachment structure 30 where the right side cowl top 28 is attached to the right front fender 15.

Figure 2:
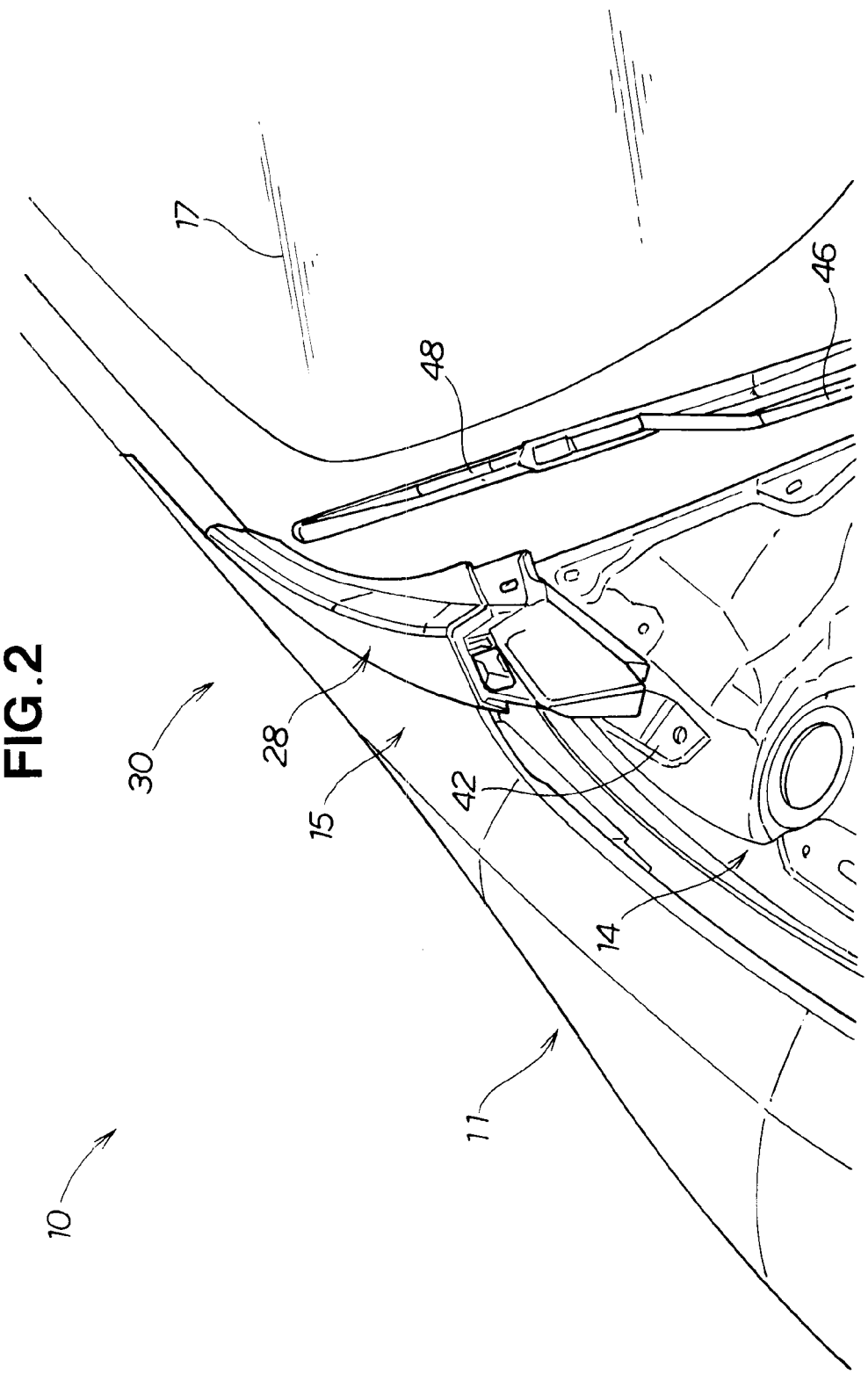
FIG. 2 is a perspective view illustrating the right side cowl top illustrated in FIG. 1 and a hood hinge.
Figure 3:
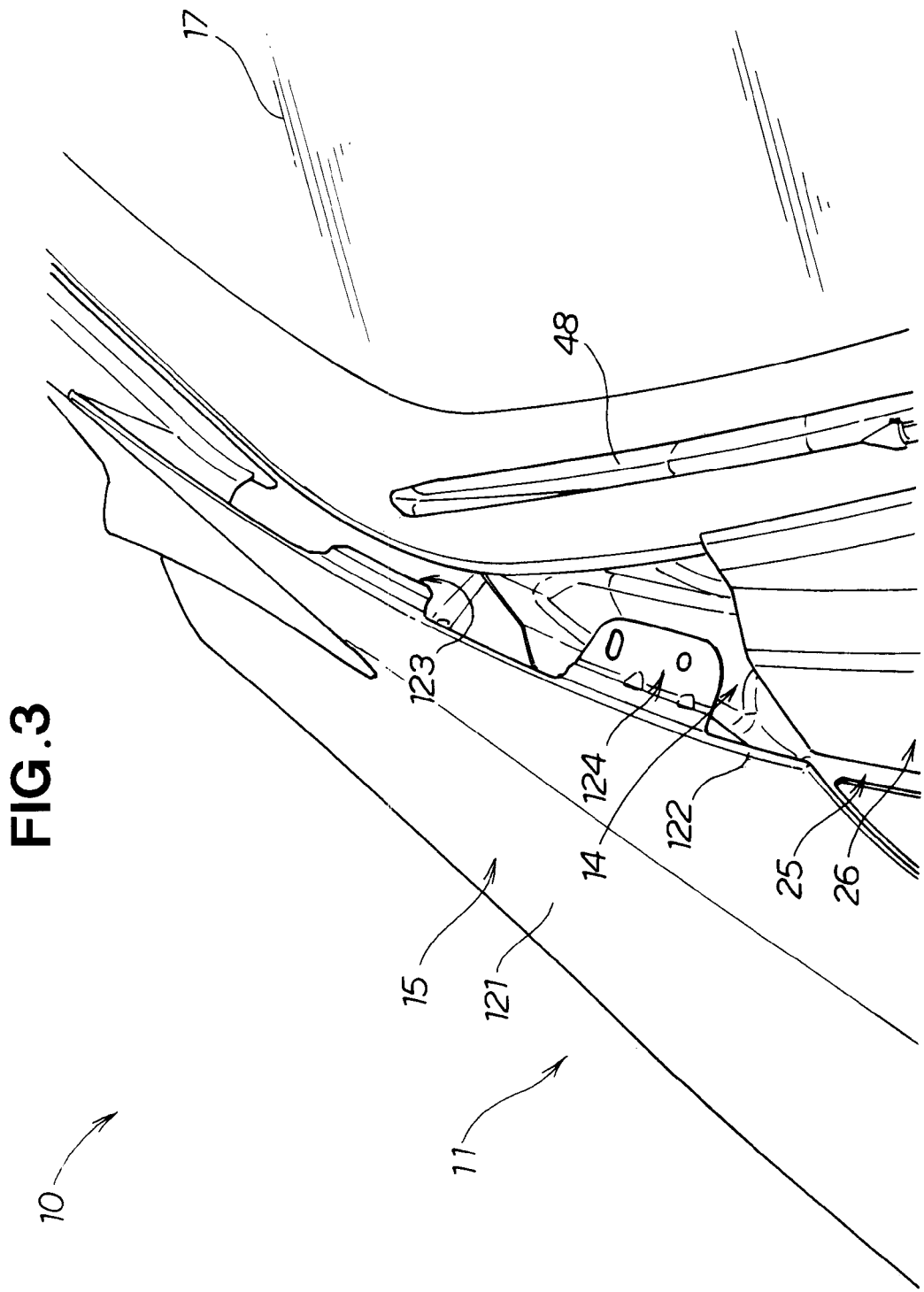
FIG. 3 is a perspective view of a front right side of the vehicle illustrated in FIG. 1 with the right side cowl top removed.
Figure 4:
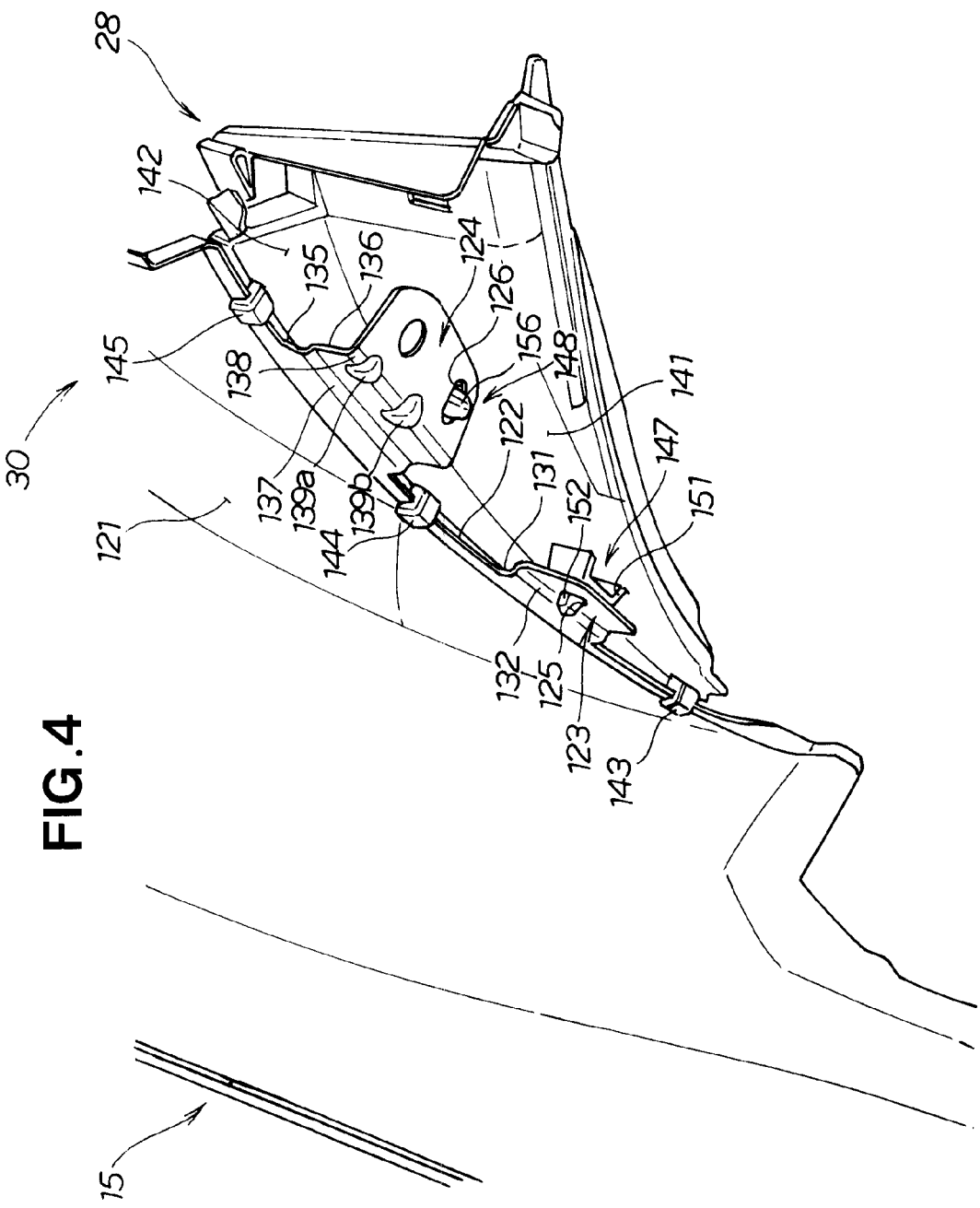
FIG. 4 is a perspective view of the right side cowl top attached to a front fender.

As illustrated in FIG. 4, the front fender 15 includes a fender body 121 which covers the side of the engine compartment 14 (FIG. 2). The fender body 121 has a bent upper part defining an edge 122 extending alongside the side cowl top 28. Formed along the edge 122 is a generally vertical first attachment flange 123 attached to the side cowl top 28. Disposed forward of the first attachment flange 123 is a generally horizontal second attachment flange 124. The first attachment flange 123 is located rearward of the second attachment flange 124.

The first attachment flange 123 is disposed along the edge 122. Further, the first attachment flange 123 defines a circular hole 125 through which the side cowl top 28 is attached to the first attachment flange 123.

The second attachment flange 124 is disposed perpendicularly to a direction of extension of the edge 122. Further, the second attachment flange 124 defines an elongated hole 126 through which the side cowl top 28 is attached to the second attachment flange 124.

Figure 5:
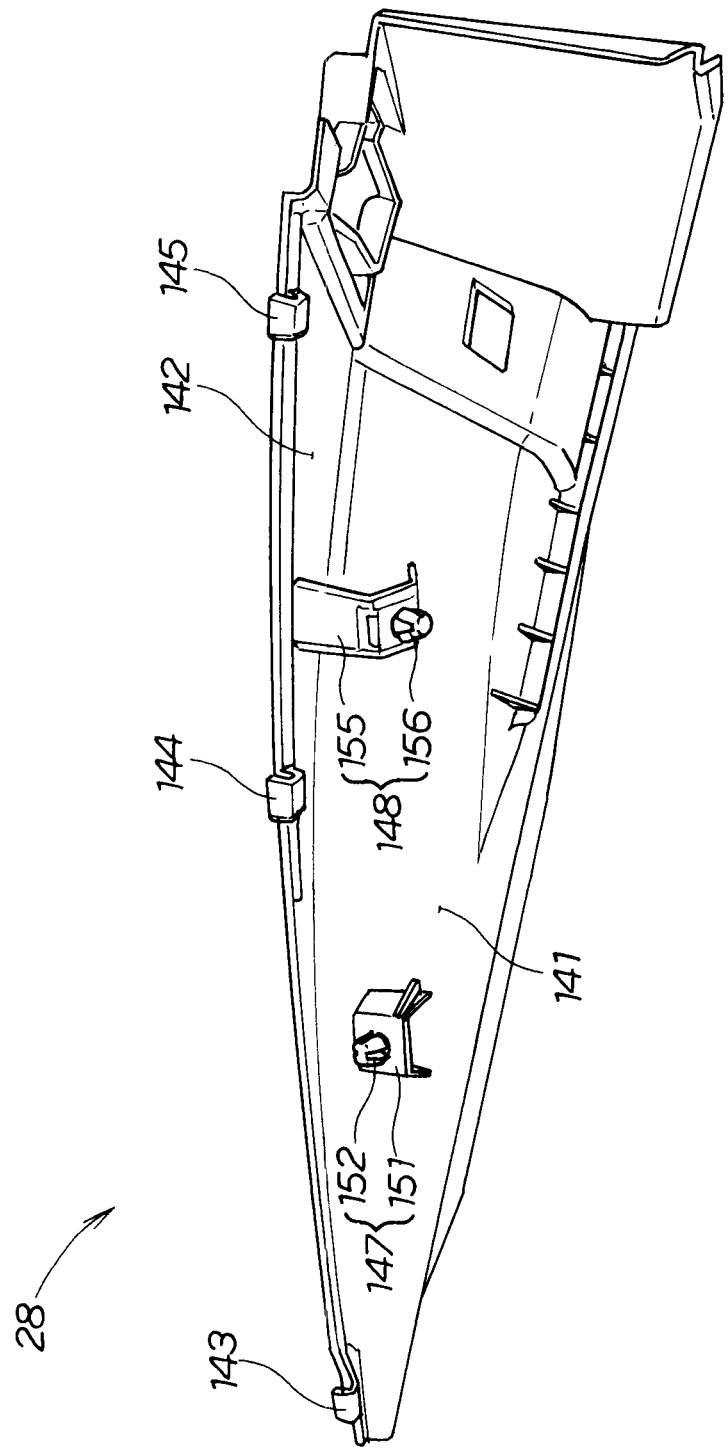
FIG. 5 is a bottom plan view of the side cowl top illustrated in FIG. 4.

As illustrated in FIGS. 4 and 5, the side cowl top 28 includes a glass-side vertical wall portion 141 disposed on a side of the windshield 17, and a fender-side lateral wall portion 142 extending from the glass-side vertical wall portion 141 toward the front fender 15 in generally perpendicular orientation to the glass-side vertical wall portion 141. The glass-side vertical wall portion 141 covers the hood hinge 42 (FIG. 2). Formed at the fender-side lateral wall portion 142 are first to third hook portions 143 to 145 which are engaged with (which are hooked to) the edge 122. The glass-side vertical wall portion 141 has a back face at which is formed a first fitting portion 147 fitted to the circular hole 125 of the first attachment flange 123. The fender-side lateral wall portion 142 has a back face at which is formed a second fitting portion 148 fitted to the elongated hole 126 of the second attachment flange 124. The fender-side lateral wall portion 142 has a generally triangular shape having an apex at the rear side.

Specifically, the front fender 15 includes an extension portion 131 projecting from the edge 122 and a stepped portion 132 projecting from the extension portion 131 toward the glass-side vertical wall portion 141. The first attachment flange 123 is a vertical flange extending downward from the lower end of the stepped portion 132 away from the edge 122.

The front fender 15 includes a first extension portion 135 projecting from the edge 122, a stepped portion 137 projecting from the first extension portion 135 toward the glass-side vertical wall portion 141, and a second extension portion 136 extending from the lower end of the stepped portion 137 in a direction away from the edge 122. The second attachment flange 124 is a horizontal flange extending from the lower end of the second extension portion 136 toward the glass-side vertical wall portion 141.

It is because of the stepped portion 122 interconnecting the first attachment flange 123 and the edge 122 that the first attachment flange 123 has predetermined stiffness despite the extension portion 131 being long.

Similarly, it is because of the stepped portion 137 interconnects the second attachment flange 124 and the edge 122 that the second attachment flange 124 has predetermined stiffness despite the first and second extension portions 135, 136 being long. Further, notches 139a, 139b are formed on a corner portion 138 between the second attachment flange 124 and the second extension portion 136 to prevent deformation of the second attachment flange 124. The second attachment flange 124 has increased stiffness due to these notices 139a, 139b as well as the stepped portion 137.

With the above, it is possible that locations of the first and second attachment flanges 123, 124 can be arbitrarily arranged. As a result, it is possible to increase design flexibility of the attachment structure 30 of the side cowl top. In addition, design flexibility of the vehicle 10 (FIG. 1) is increased as well.

The glass-side vertical wall portion 141 and the fender-side lateral wall portion 142 jointly define a generally L-shaped cross-section. Each of the hook portions 143 to 145 defines a generally U-shape opening toward the edge 122. The first fitting portion 147 includes a generally U-shaped base portion 151 disposed on the back face of the glass-side vertical wall portion 141 and a fitting protrusion 152 disposed on the base portion 151 and fitted to the circular hole 125 of the first attachment flange 123.

The second fitting portion 148 includes a base mount 155 having one end disposed on the fender-side lateral wall portion 142 and an opposite end disposed on the glass-side vertical wall portion 141. Protruding from the base mount 155 in a direction generally parallel to the glass-side vertical wall portion 141 is a fitting protrusion 156 fitted to the elongated hole 126 of the second attachment flange 124.

As illustrated in FIG. 1, with the attachment structure 30, the boundary 161 between the left side cowl top 27 and the cowl top 25 is contiguous to the boundary 162 between the left front fender 15 and the hood 16. Likewise, the boundary 163 between the right side cowl top 28 and the cowl top 25 is contiguous to the boundary 164 between the right front fender 15 and the hood 16. As a result, design quality of the vehicle 10 can be improved.

Thus, the attachment structure 30 is a technology enabling to achieve actualization of the vehicle 10, which is designed so that the boundary lines 161, 163 between the cowl top 25 and the bilateral side cowl tops 27, 28 are designed to be continuously connected to the boundary lines 162, 163 between the hood 16 and the front fenders 15, 15 while the windshield 17 is designed to be widely rounded (curved).

Next, a process for attaching the side cowl top 28 to the front fender 15 will be described with reference to FIGS. 6(a) to 6(c).

As illustrated in FIG. 6(a), the side cowl top 28 is brought into face-to-face relation with the front fender 15. The first and third hook portions 143 to 145 are opposed to the edge 122 as indicated by arrows a1 to a3. As described later, the fitting protrusion 152 of the first fitting portion 147 is to be fitted to the circular hole 125 of the first attachment flange 123 as indicated by arrow a4. The fitting protrusion 156 of the second fitting portion 148 is to be fitted to the elongated hole 126 of the second attachment flange 124 as indicated by arrow a5.

As illustrated in FIG. 6(b), the hook portions 143 to 145 are brought into engagement with the edge 122 as indicated by arrows b1 to b3. In this state, the side cowl top 28 is rotated as indicated by arrow b4. Accordingly, the fitting protrusion 152 (FIG. 6(a)) of the first fitting portion 147 is inserted into the circular hole 125 of the first attachment flange 123 as indicated by arrow b5. The fitting protrusion 156 (FIG. 6(a)) of the second fitting portion 148 is inserted into the elongated hole 126 of the second attachment flange 124 as indicated by arrow b6.

As illustrated in FIG. 6(c), the side cowl top 28 is further rotated as indicated by arrow c1. Accordingly, the fitting protrusion 152 of the first fitting portion 147 is fitted to the round hole 125 (FIG. 6(a)) of the first attachment flange 123 as indicated by arrow c2. The fitting protrusion 156 of the second fitting portion 148 is fitted to the elongated hole 126 (FIG. 6(a)) of the second attachment flange 124 as indicated by arrow c3.

With the fitting protrusion 156 fitted into the elongated hole 126 formed on the second attachment flange 124, the second fitting portion 148 which is generally perpendicular to the first fitting portion 147 is fitted to the second attachment flange 124. The first fitting portion 147 is fitted to the round hole 125 of the first attachment flange 123. As a result, the side cowl top 28 is attached to the front fender 15 to maintain positional accuracy of the side cowl top 28 relative to the front fender 15.

Figure 6:
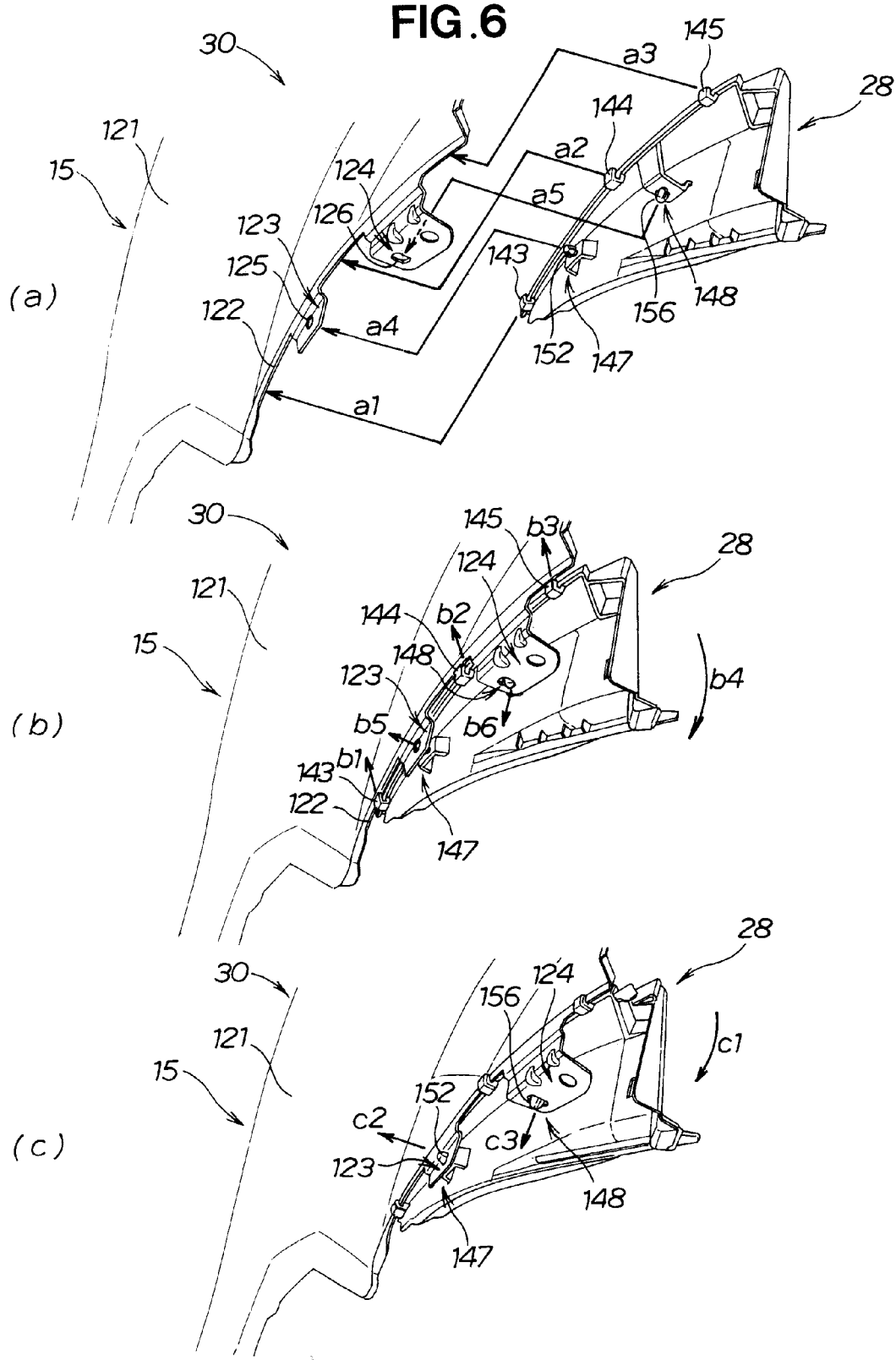
FIG. 6 is a view illustrating a process for attaching the side cowl top illustrated in FIG. 4 to the front fender.

As illustrated in FIGS. 4 to 6, in the attachment structure 30, the side cowl top 28, which is disposed in a space defined by the cowl top 25 (FIG. 1), the front fender 15 and the windshield 17, conceals the hood hinge 42 supporting the hood 16 in such a manner as to allow the hood 16 to move between the open position and the closed position.

The front fender 15 includes the edge 122, the vertical first attachment flange 123, the circular hole 125 formed on the first attachment flange 123, the horizontal second attachment flange 124, and the elongated hole 126 formed on the second attachment flange 124. The side cowl top 28 includes the plurality of hook portions 143 to 145 to be engaged with the edge 122, the first fitting portion 147 to be engaged with the first attachment flange 123, and the second fitting portion 148 to be engaged with the second attachment flange 124. Accordingly, easy attachment of the side cowl top 28 to the edge 122 can be achieved by rotation of the side cowl top 28 with the hook portions 143 to 145 engaged with the edge 122. That is, the side cowl top 28 can be easily attached even to a narrow and long-concaved space which is surrounded by the center cowl top 26, the front fender 15, and the windshield 17.

The first attachment flange 123 is located rearward of the second attachment flange 124 perpendicular to the direction of extension of the edge 122. This arrangement of the flanges 123, 124 accommodates generally triangular shape of the side cowl top 28 having an apex at its rear part.

The fender-side lateral wall portion 142 of the side cowl top 28 has a surface lying in flush with to a surface of the front fender 15. The glass-side vertical wall portion 141 of the side cowl top 28 is disposed on the side of the windshield 17 (FIG. 1). Since the fender-side lateral wall portion 142 and the glass-side vertical wall portion 141 jointly define the generally L-shaped cross-section, easy attachment of the side cowl top 28 to the front fender is achieved by rotation of the side cowl top 28 with the hook portions 143 to 145 engaged with the edge 122 even if the fender-side lateral wall portion 142 has larger width. As a result, it is possible to increase design flexibility of the hinge cover 28.

In the attachment structure 30 of the present embodiment, the side cowl top has the first to third hook portions 143 to 145, as illustrated in FIG. 4. However, the number of the hook portions may be arbitrarily increased or decreased.

Further, it is also arbitrary to increase the number of the first and second attachment flanges 123, 124 and the first and second fitting portions 147, 148 as needed.

Figure 7:
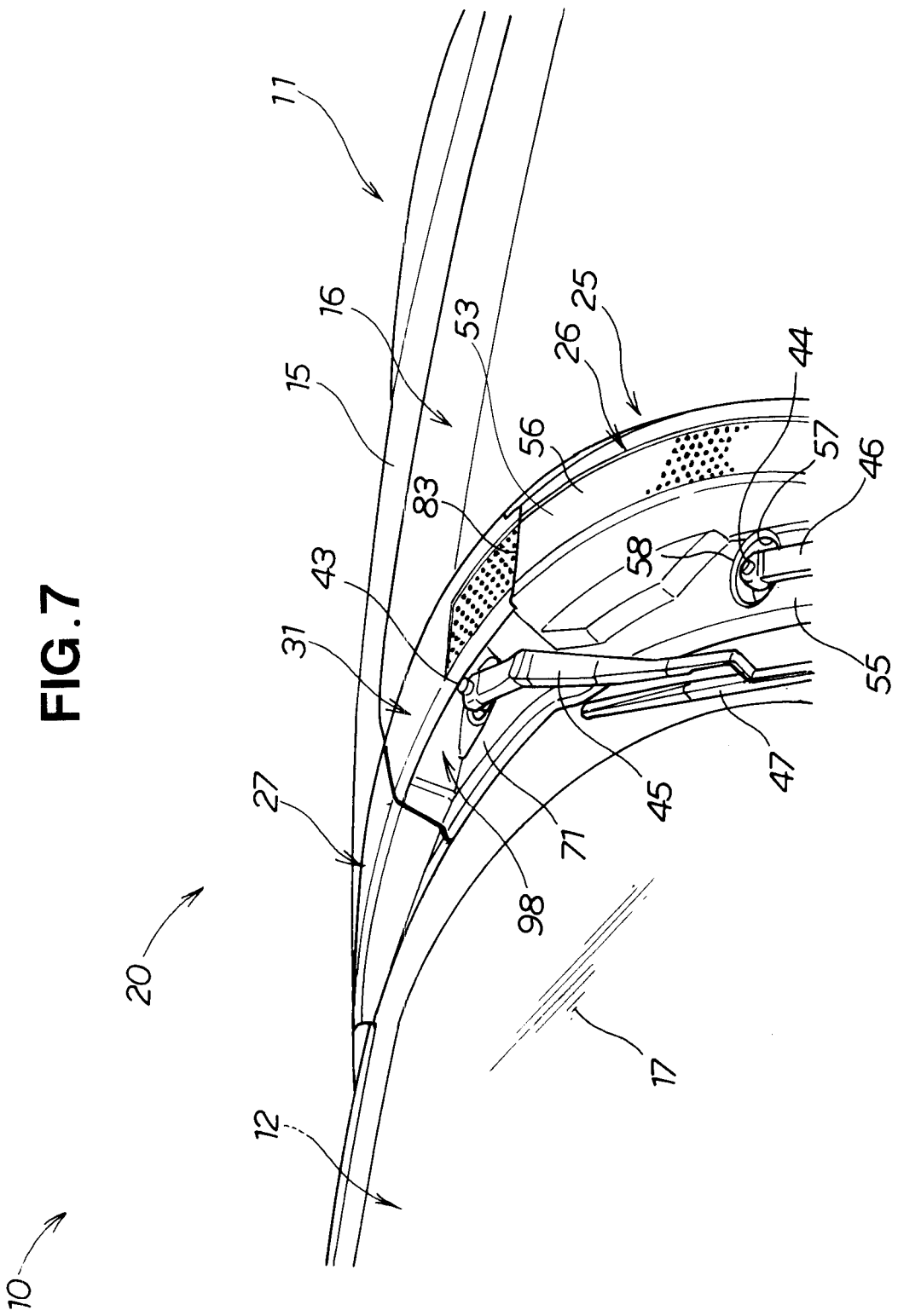
FIG. 7 is a perspective view of the cowl top structure illustrating in FIG. 1.
Figure 9:
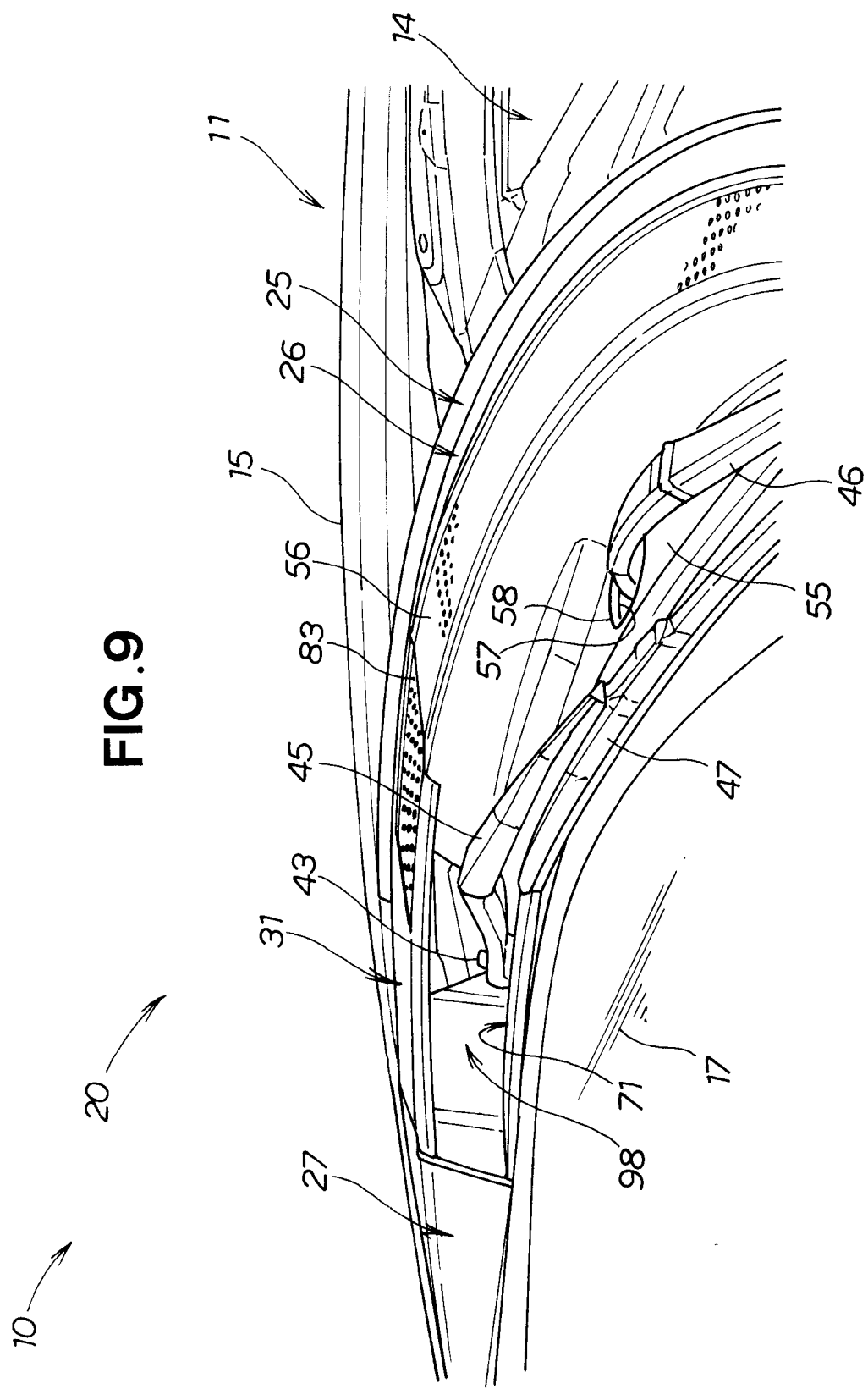
FIG. 9 is an enlarged perspective view of the cowl top structure illustrated in FIG. 7.
Figure 10:
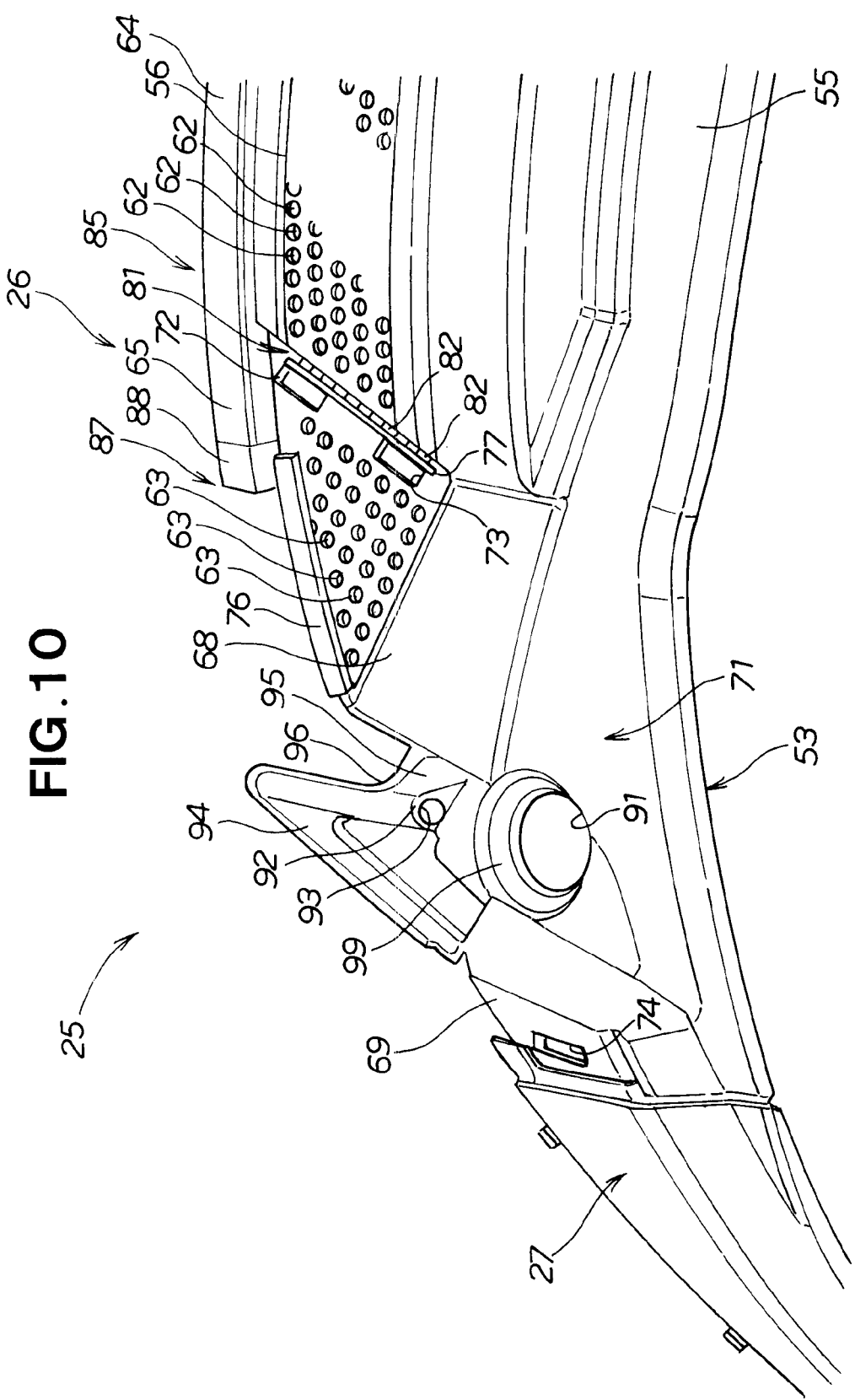
FIG. 10 is a perspective view of the cowl top illustrated in FIG. 2.
Figure 11:
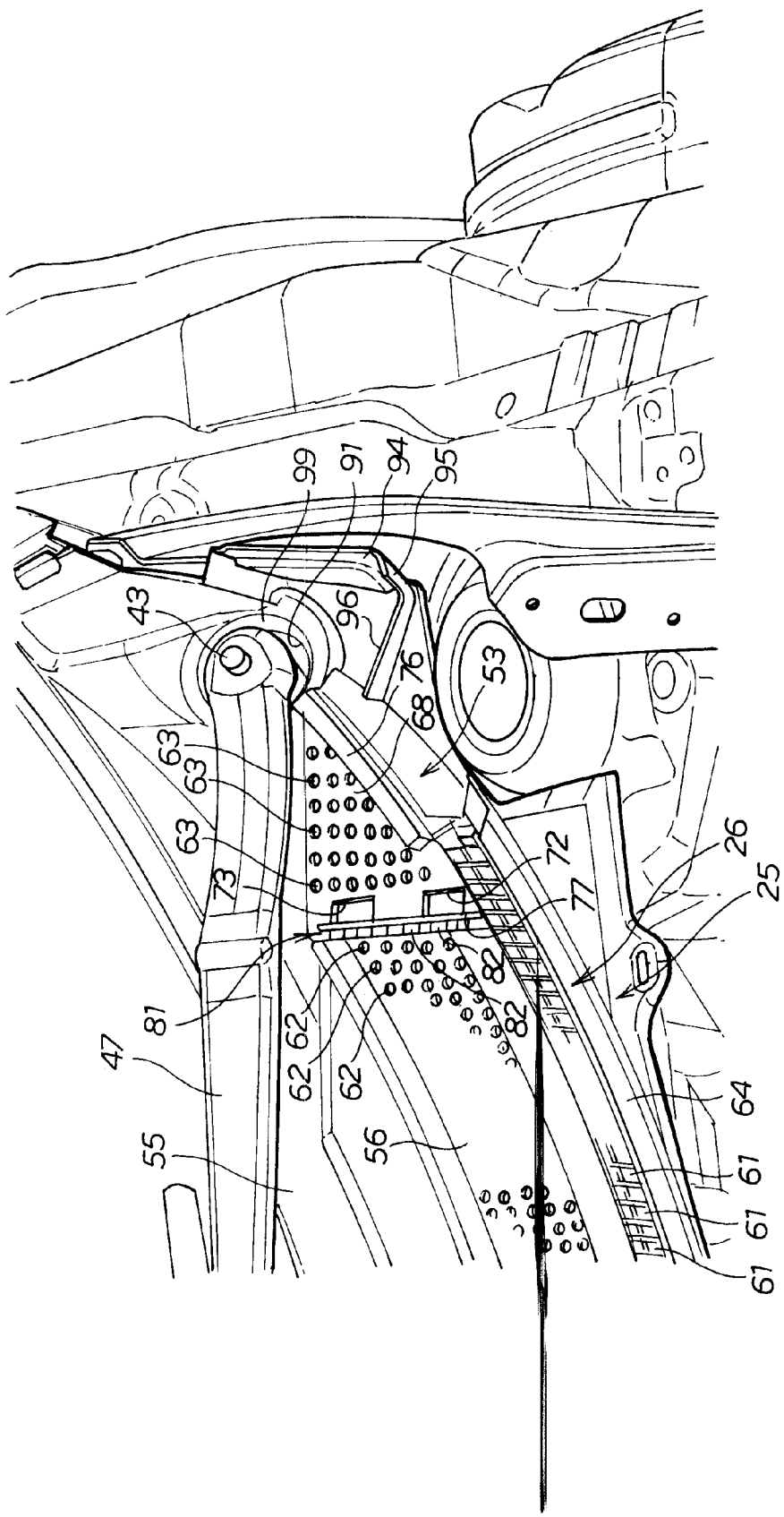
FIG. 11 is an enlarged perspective view of the cowl top structure illustrated in FIG. 8 with a cover member detached.

Referring to FIGS. 9 to 11, the center cowl top 26 includes a center base portion 55 disposed on the side of the windshield 17 and a central, convexly curved portion 56 projecting from the center base portion 55 toward the hood 16. The center base portion 55 includes a ring-shaped inclined wall 58 having a diameter enlarged toward a top thereof. The ring-shaped inclined wall 58 defines a right through-hole 57 accommodating the right wiper rotational shaft 44 (FIG. 7).

Figure 8:
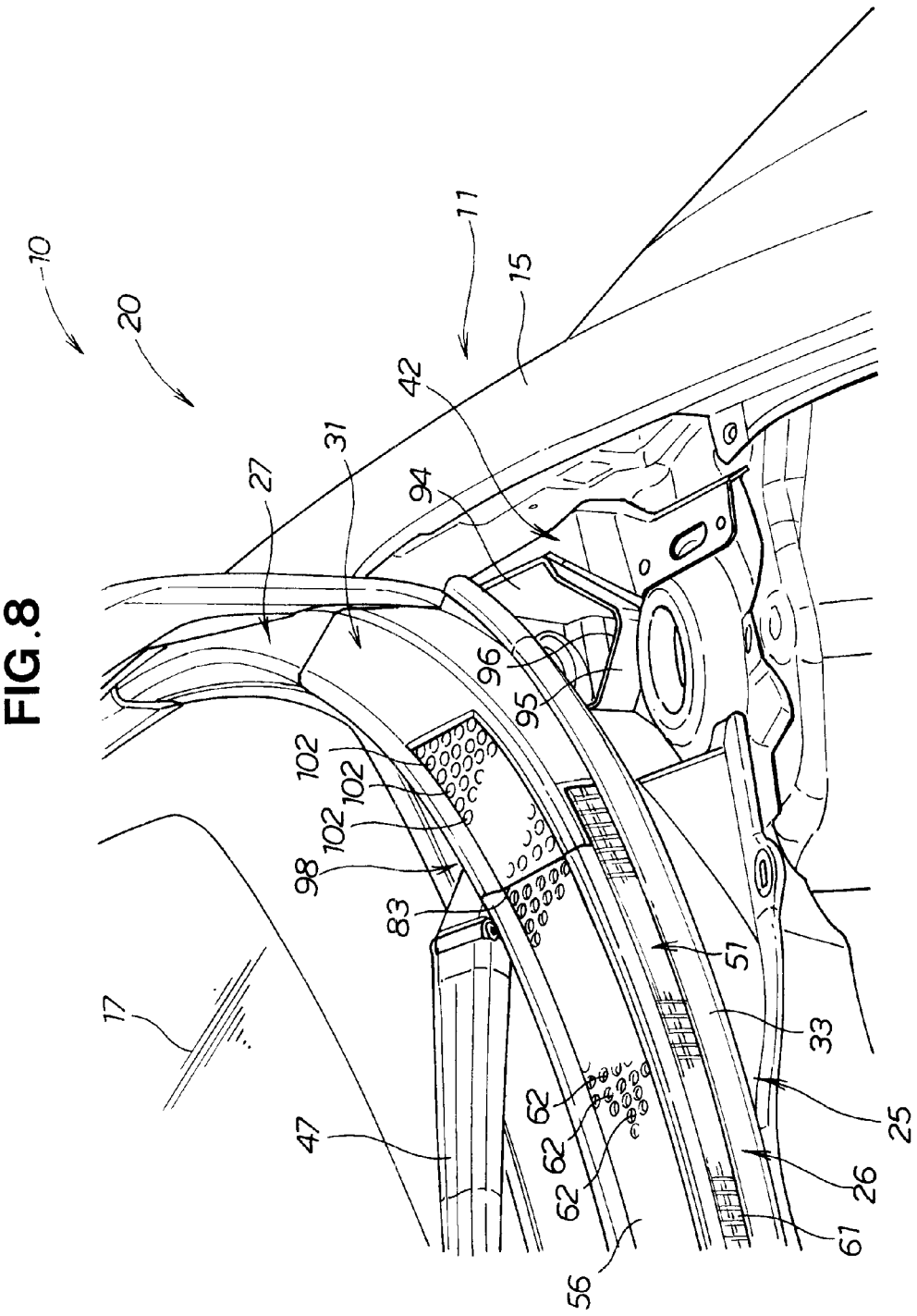
FIG. 8 is a perspective view of the cowl top structure with a hood detached from the vehicle illustrated in FIG. 7.

The central convex portion 56 has a front face defining a plurality of front air holes 61 for introducing air into the engine compartment 14, an upper face defining a plurality of air-introducing holes 62 for introducing air into the engine compartment 14, and a center attachment rib 64 protruding forward from the front face of the central convex portion 56. Attached to the center attachment rib 64 is the hood sealing 33 (FIG. 8).

The side end portion 53 of the center cowl top 26 includes an end-side projecting portion 68 contiguous to the central convex portion 56, an outer projecting portion 69 disposed outside the end-side projecting portion 68 in spaced relation with the end-side projecting portion 68, and a recess 71 in a space area defined by the end-side projecting portion 68 and the outer projecting portion 69.

The end-side projecting portion 68 includes first and second locking holes 72, 73 formed on an upper face of the end-side projecting portion 68 and locks the cover member 31, and a plurality of air-introducing holes 63 formed on the upper face of the end-side projecting portion 68 for introducing air into the engine compartment 14. Disposed on the upper face of the end-side projecting portion 68 are a lateral convex portion 76 and a vertical convex portion 77 which provide clearance between the air-introducing holes 63 and the back face of the cover member 31. Disposed between the vertical convex portion 77 and the central convex portion 56 is a fragile portion 81. Contiguous to the center attachment rib 64 is an end attachment rib 65 protruding forward from a front face of the end-side projecting portion 68. Attached to the end attachment rib 65 is the hood sealing 33 (FIG. 8).

The fragile portion 81 can be broken, when a predetermined load is applied from a pedestrian to the center cowl top 26 (the cowl top 25), for reducing impact on the pedestrian to allow for protection of the pedestrian. The fragile portion 81 defines a plurality of lightening square-holes 82 for along a boundary 83 between the cover member 31 and the center cowl top 26. In other words, the fragile portion 81 is formed in an area which the cover member 31 overlaps.

The end attachment rib 65 and the center attachment rib 64 jointly define a first attachment rib 85. The end attachment rib 65 has an end-side halving portion 88 having a half thickness of the overall thickness of the end attachment rib 65. The end-side halving portion 88 of the first attachment rib 85 provides an overlap portion 87 which the cover member 31 overlaps, as will be detailed later with reference to FIG. 13. The outer projecting portion 69 has an upper face defining a third locking hole 74 which locks the cover member 31.

The recess 71 is located between the end-side projecting portion 68 and the outer projecting portion 69 at substantially the same level as the center base portion 55. Specifically, the recess 71 includes a left through-hole 91 accommodating the left wiper rotational shaft 43, a stepped recess 92 located lower than a surface of the recess 71 in front of the left through hole 91. The stepped recess 92 defines a drainage aperture 93 for draining rainwater accumulated in the recess 71 so as to discharge the rainwater to the outside of the engine compartment 14. The recess 71 further includes a side wall 94 extending from the outer projecting portion 69 to the front of the drainage aperture 93 and concealing the hood hinge 42 (FIG. 8). The recess 71 also includes an erected wall 95 interconnecting the side wall 94 and the end-side projecting portion 68. The erected wall 95 has a cut-out at a top thereof, and the cut-out defines an opening 96.

The recess 71 formed on the center cowl top 26 and the cover member 31 covering the recess 71 jointly define an accommodating portion 98.

The opening 96 is configured for removal of snow accumulated at the accommodating portion 98 from the side of the engine compartment 14. The left through-hole 91 is defined by a ring-shaped inclined wall 99 having a diameter increasing toward a top thereof. The erected wall 95 is configured to block rainwater.

Figure 12:
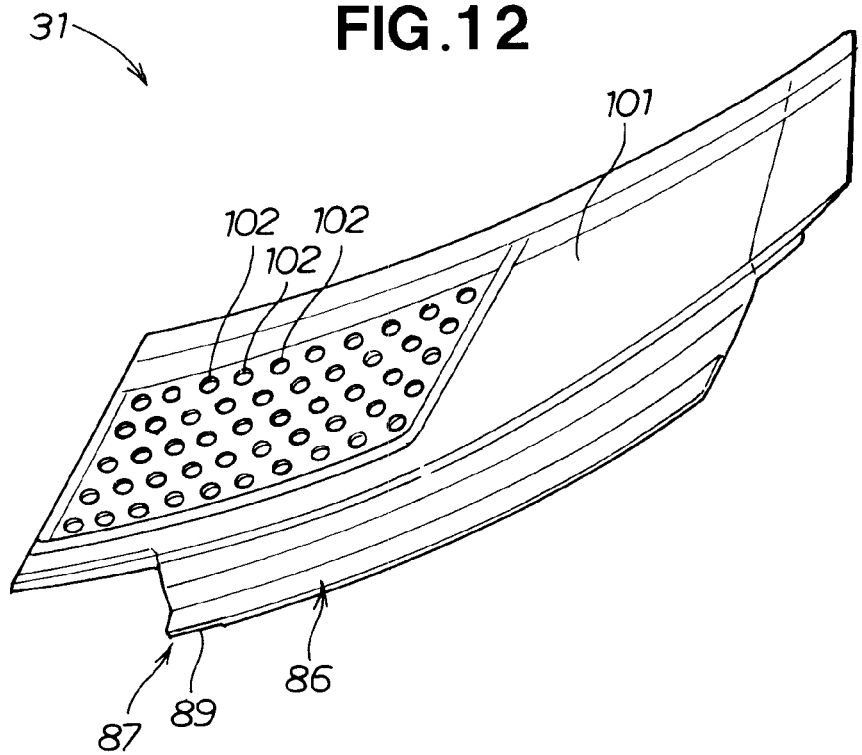
FIG. 12 is a perspective view of a front side of the cover member illustrated in FIG. 2.
Figure 13:
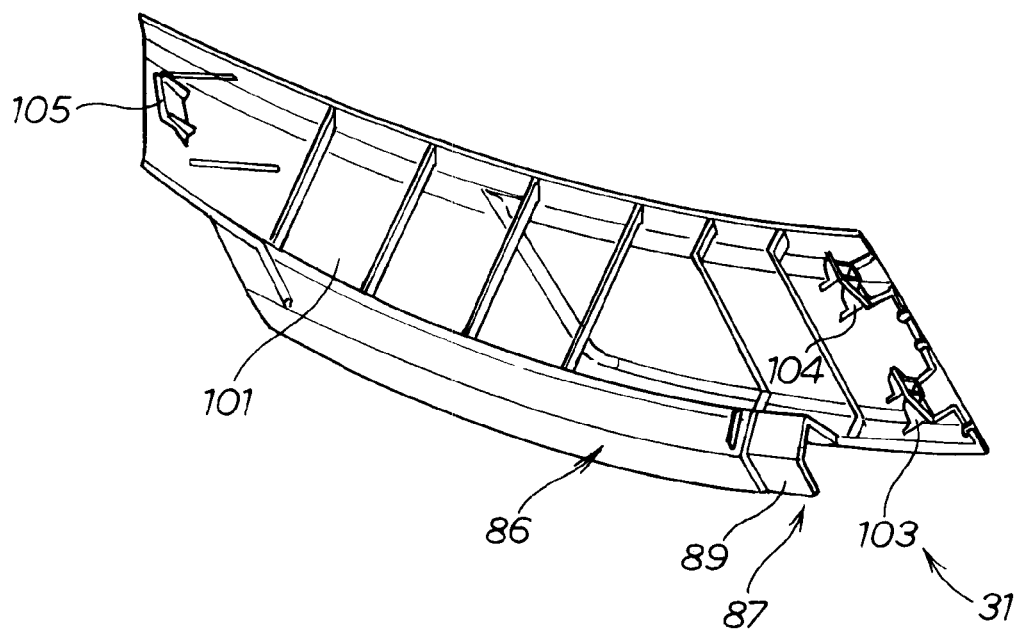
FIG. 13 is a perspective view of a back side of the cover member illustrated in FIG. 2.

As illustrated in FIGS. 12 and 13, the cover member 31 includes a generally flat body portion 101, a plurality of ornamental blind holes 102 formed on an upper face of the main body portion 101 in correspondence to the air-introducing holes 63 (FIG. 11). The cover member 31 also includes a second attachment rib 86 projecting forward from a front-lower part of the body portion 101. Attached to the second attachment rib 86 is the hood sealing 33 (FIG. 8). Disposed on the center cowl top 26 are first to third locking claws 103 to 105 which are respectively locked in the first to third locking holes 72 to 74 (FIG. 10) formed on the center cowl top 26 (FIG. 11). The blind holes 102 have concave shape.

The blind holes 102 are arranged at an area corresponding to the plurality of air-introducing holes 63. Specifically, the pluralities of air-introducing holes 62, 63 (FIG. 10) are formed on the center cowl top 26. The plurality of air-introducing holes 63 is located below the cover member 31.

The second attachment rib 86 has a cover-member-side halving portion 89 which has a half thickness of the overall thickness of the second attachment rib 86. The cover-member-side halving portion 89 of the second attachment rib 86 provides an overlap portion 87 which overlies the overlapping portion 87 provided by the end-side halving portion 88 (FIG. 10) of the first attachment rib 85 of the center cowl top 26 (the side end portion 53) (FIG. 7). In short, the first attachment rib 85 and the second attachment rib 86 overlap at their overlap portions 87, 87. The sum of the thickness of the end-side halving portion 88 and the thickness of the cover-member-side halving portion 89 is approximately the same as the thickness of the end attachment rib 65 or the thickness of the second attachment rib 86.

As illustrated in FIGS. 1 and 7 to 11, in the cowl top structure 20, the hood 16 is attached to the vehicle body 11 via the hood hinge 42 in such a manner as to move between the open position and the closed position to cover the engine compartment 14. The cowl top 25 is disposed behind the hood 16, and the wiper rotational shaft 43 of the wiper arm 45 is covered with the cowl top 25.

Since the accommodating portion 98 formed in the cowl top 25 has sufficient depth to conceal the wiper rotational shaft 43, vehicle appearance can be improved. The opening 96 for scooping out snow from the side of the engine compartment 14 is provided in the recess 71 of the accommodating portion 98. When snow accumulated at the accommodating portion 98 is to be scooped out, a finger is put into the opening 96 from the side of the engine compartment 14 with the hood 16 in the opened position. Then, the snow is scooped out of the opening 96 with the finger.

Provision of the accommodating portion 98 defined by the recess 71 of the cowl top 25 (the center cowl top 26) and the cover member 31 covering the recess 71 enables easy attachment and detachment of the wiper device 18 including the wiper arm 45. As a result, it is possible to assemble the vehicle with improved efficiency.

It is because the recess 71 includes the side wall 94 which conceals the hood hinge 42 that the hood hinge 42 is invisible from the outside of the vehicle body. As a result, vehicle appearance can be further improved.

It is because the erected wall 95 configured to block rainwater that no rainwater enters the side of the engine compartment 14.

Since the drainage aperture 93 which drains rain water to the outside of the engine compartment 14 is formed in the recess 71, rainwater can be smoothly drained to the outside of the engine compartment 14. As a result, it is possible to prevent ingress of rain water into the engine compartment 14.

The air-introducing holes 62, 63 for introducing air into the engine compartment 14 are formed through the cowl top 25 (the center cowl top 26). Some of the air-introducing holes 62, 63 is located below the cover member 31. Air entering the air-introducing holes 63 through the clearance between the cowl top 25 and the cover member 31 is introduced into the engine compartment 14. The wiper rotational shaft 43 is concealed by the cover member 31.

On the side of the hood 16, the cowl top 25 (the center cowl top 26) includes the first attachment rib 85 to which the hood sealing 33 is fitted. On the side of the hood 16, the cover member 31 includes the second attachment rib 86 (see FIG. 7) to which the hood sealing 33 is fitted. Each of the overlap portions 87, 87 of the first and second attachment ribs 85, 86 has the half thickness. This means that the hood sealing 33 is fitted to both the cover member 31 and the cowl top 25 with the cover member 31 contiguous to the cowl top 25. More specifically, the hood sealing 33 is fitted to both of the first and second attachment ribs 85, 86 with the ribs 85, 86 contiguous to each other, so that the vehicle can be assembled with improved efficiency. Further, it is also possible to prevent the cover member 31 from being deliberately detached.

The cowl top 25 (the center cowl top 26) includes the fragile portion 81 formed in the area which the cover member 31 overlaps, such that the fragile portion can be broken when a predetermined load is exerted to the cowl top 25. The breaking of the fragile portion helps protect pedestrians.

The cowl top structure of the present embodiment is described as a structure at the left side of the vehicle, as illustrated in FIG. 1. However, not limited to the above, it is also possible to be adopted as a structure at the right side of the vehicle body 11.

Industrial Applicability

The vehicle body structure of the present invention is suitable for a vehicle in which a hood top end is set at a low position while a windshield is widely curved, and in particular, for a vehicle in which a wiper rotational shaft is concealed.

REFERENCE SIGNS LIST

10 Vehicle
14 Engine compartment
15 Front fender
16 Hood
17 Windshield
20 Cowl top structure
25 Cowl top
27, 28 Side cowl tops
30 Attachment structure of side cowl top
31 Cover member
33 Hood sealing
42 Hood hinge
43 Wiper rotational shaft
45 Wiper arm
62, 63 Air-introducing holes
71 Recess
81 Fragile portion
85, 86 First and second attachment ribs
87 Overlapping portion
88, 89 Halving portions
93 Drainage aperture
94 Side wall
95 Erected wall
96 Opening
98 Accommodating portion
102 Appearance hole
122 Edge
123, 124 First and second attachment flanges
125 Circular hole
126 Elongated hole
141 Glass-side vertical wall portion
142 Fender-side lateral wall portion
143 to 145 Hook portions
147, 148 First and second fitting portions

The invention claimed is:

1. A vehicle body structure comprising:
   right and left front fenders;
   a windshield;
   a cowl top; and
   side cowl tops each disposed within a space defined by the windshield, the cowl top, and each of the right and left front fenders,
   wherein the front fender includes an edge extending alongside the side cowl top, a first attachment flange disposed along the edge, a second attachment flange disposed perpendicularly to a direction of extension of the edge, and an elongated hole formed on the second attachment flange; and
   wherein each of the side cowl tops includes an upwardly open hook portion engaged with the edge, a first fitting portion engaged with the first attachment flange, and a second fitting portion engaged with the second attachment flange.

2. The vehicle body structure of claim 1, wherein the first attachment flange is located rearward of the second attachment flange.

3. The vehicle body structure of claim 1, wherein each of the side cowl tops includes a fender-side lateral wall portion contiguous to the front fender and a glass-side vertical wall portion disposed on a side of the windshield side, and wherein the fender-side lateral wall portion and the glass-side vertical wall portion jointly define a generally L-shaped cross-section.

4. The vehicle body structure of claim 1, further comprising a hood covering an engine compartment and pivotably attached to a vehicle body via a hood hinge in such a manner as to move between an opened position and a closed position,
   wherein the cowl top is disposed rearward of the hood and covers a wiper rotational shaft of a wiper arm, and
   wherein the cowl top includes an accommodating portion accommodating the wiper rotational shaft and an opening defined in the accommodating portion for removal of snow from a side of the engine compartment.

5. The vehicle body structure of claim 4, wherein the accommodating portion includes a recess formed in the cowl top and a cover member covering the recess.

6. The vehicle body structure of claim 5, wherein the recess includes a side wall concealing the hood hinge.

7. The vehicle body structure of claim 5, wherein the recess includes an erected wall disposed at a lower end of the opening to block rain water.

8. The vehicle body structure of claim 5, wherein the recess includes a drainage aperture for draining rainwater off the engine compartment.

9. The vehicle body structure of claim 5, wherein the cowl top includes a plurality of air-introducing holes formed therethrough for introducing air into the engine compartment, wherein the plurality of air-introducing holes include ones located below a portion of the cover member, and wherein the portion of the cover member defines a plurality of ornamental blind holes.

10. The vehicle body structure of claim 5, wherein the cowl top includes a first attachment rib fitted to a hood sealing disposed on a side of the hood, and wherein the cover member includes a second attachment rib fitted to the hood sealing disposed at the side of the hood, and wherein the first attachment rib and the second attachment rib overlap at overlap portions thereof, the overlap portion of the first attachment rib has a half thickness of an overall thickness of the first attachment rib, and the overlap portion of the second attachment rib has a half thickness of an overall thickness of the second attachment rib.

11. The vehicle body structure according to claim 5, wherein the cowl top includes a fragile portion, and the cover member overlaps the fragile portion.

* * * * *